United States Patent
Hassan (10) Patent No.: US 12,477,463 B2
(45) Date of Patent: Nov. 18, 2025

(54) METHODS AND APPARATUSES FOR SIDELINK COMMUNICATION

(71) Applicant: Robert Bosch GmbH, Stuttgart (DE)

(72) Inventor: Khaled Shawky Hassan, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 373 days.

(21) Appl. No.: 17/580,758

(22) Filed: Jan. 21, 2022

(65) Prior Publication Data

US 2022/0240183 A1 Jul. 28, 2022

(30) Foreign Application Priority Data

Jan. 22, 2021 (EP) ..................................... 21152929

(51) Int. Cl.
*H04W 52/02* (2009.01)
*H04W 72/121* (2023.01)
*H04W 72/20* (2023.01)

(52) U.S. Cl.
CPC ... *H04W 52/0229* (2013.01); *H04W 52/0219* (2013.01); *H04W 72/121* (2013.01); *H04W 72/20* (2023.01)

(58) Field of Classification Search
CPC . H04W 52/00; H04W 52/02; H04W 52/0209; H04W 52/0219; H04W 52/0225; H04W 52/0229; H04W 72/121; H04W 72/20; H04W 52/028; H04W 88/04; H04W 76/28; Y02D 30/70
See application file for complete search history.

(56) References Cited

U.S. PATENT DOCUMENTS

| 2020/0053647 | A1 | 2/2020 | Chae et al. | |
|---|---|---|---|---|
| 2022/0095232 | A1* | 3/2022 | Li | H04W 52/0235 |
| 2022/0095326 | A1* | 3/2022 | Li | H04L 1/1896 |
| 2022/0110141 | A1* | 4/2022 | Kwak | H04W 76/28 |
| 2023/0018928 | A1* | 1/2023 | Luo | H04W 52/0219 |
| 2023/0262601 | A1* | 8/2023 | Ganesan | H04W 52/0245 370/311 |
| 2023/0345371 | A1* | 10/2023 | Xin | H04W 4/06 |

FOREIGN PATENT DOCUMENTS

| WO | 2018206124 A1 | 11/2018 |
|---|---|---|
| WO | 2020150871 A1 | 7/2020 |
| WO | 2020164009 A1 | 8/2020 |

OTHER PUBLICATIONS

Intel Corporation, "Sidelink enhancements for UE power saving", 3GPP TSG RAN WG1 Meeting #103-E, 2020, 9 pages, R1-2008998.
MediaTek Inc., "Power saving techniques for sidelink", 3GPP TSG RAN WG1 Meeting #102, 2020, 2 pages, R1-2005642.
LG Electronics, "Discussion on power saving signal/channel in MTC", 3GPP TSG RAN WG1 Meeting 90bis, 2017, 12 pages, R1-1717279.

* cited by examiner

*Primary Examiner* — Robert C Scheibel
(74) *Attorney, Agent, or Firm* — Michael Best & Friedrich LLP (57) ABSTRACT

There is provided a method that comprises: determining (102; 112) at least one wake-up opportunity (WO1-*n*), wherein the at least one wake-up opportunity (WO1-*n*) indicates at least one radio resource available for transmitting at least one wake-up signal (WUS1-2); and transmitting (120; 130), via a sidelink channel, in particular via a sidelink control channel, the at least one wake-up signal (WUS1-2) on the at least one wake-up opportunity (WO1-*n*).

25 Claims, 3 Drawing Sheets

METHODS AND APPARATUSES FOR SIDELINK COMMUNICATION

BACKGROUND OF THE INVENTION

There are provided advances in Sidelink Communication in Radio Communication Networks.

SUMMARY OF THE INVENTION

A first aspect of the description is directed to a method that comprises: determining at least one wake-up opportunity, wherein the at least one wake-up opportunity indicates at least one radio resource available for transmitting at least one wake-up signal; and transmitting, via a sidelink channel, in particular via a sidelink control channel and/or sidelink broadcast channel, the at least one wake-up signal on the at least one wake-up opportunity.

For another apparatus to operate in a power saving mode or sleeping mode, the wake-up signal allows this apparatus to wake-up, switch into an active mode, and communicate via sidelink. Therefore, the active time is reduced and the power saving time is increased. Unnecessary blind decoding is reduced and power is saved.

According to an advantageous example, the wake-up signal comprises a sidelink group identifier identifying a group of terminals.

Advantageously, only a certain group or type of terminals will be activated. For example, a group identifier in the transmitted wake-up signal identifies cars to wake up, whereas wearables like smart-watches or household appliances may keep sleeping.

According to an advantageous example, the determining of the at least one wake-up opportunity comprises: determining the at least one wake-up opportunity from at least one sidelink resource pool, in particular of a pre-configured sidelink resource pool.

Advantageously, the at least one sidelink resources pool provides a default scheme for selecting the wake-up opportunities.

According to an advantageous example, the method comprises: transmitting, via the sidelink channel, in particular via the sidelink control channel, at least one wake-up opportunity indicator, in particular an offset in time and/or frequency to the radio resource on which the wake-up indicator is transmitted, wherein the wake-up opportunity indicator indicates at least one radio resource that is available for transmitting the at least one wake-up-signal.

Advantageously, the transmitting apparatus becomes some kind of master or reference for the other apparatuses, in particular with regard to the synchronization of the monitoring radio resource.

According to an advantageous example, the method comprises: determining a wake-up periodicity, in particular based on the at least one resource pool, wherein the wake-up periodicity prescribes a time period between at least two subsequent wake-up opportunities; and transmitting, via the sidelink channel, in particular via the sidelink control channel, the at least one wake-up periodicity.

The transmitting apparatus acts as a master or reference node defining the periodicity for other apparatuses.

According to an advantageous example, the method comprises: transmitting, via the sidelink channel, in particular via the sidelink control channel, a sleep signal.

Advantageously, the transmission of the sleep signal allows the transmitting device to govern the receiving device with regard to its sleeping status.

According to an advantageous example, the method comprises: transmitting and/or receiving, via the sidelink channel, in particular via a sidelink shared channel, sidelink payload data after expiry of a pre-configured activation time period since the transmission of the at least one wake-up signal.

By taking the activation time duration into account, it becomes possible to set up the sleeping terminals and especially their transceivers in a simpler and more energy-saving way.

According to an advantageous example, the method comprises: determining, in particular based on the at least one sidelink resource pool, an active time period that indicates how long another apparatus is at least active before returning to a sleep mode; and transmitting, via the sidelink channel, in particular via the sidelink control channel, the active time period.

By defining the active time period and providing this active time period to the other terminals, the transmitting apparatus is able to adapt the active time period to application requirements. On the other side, the other apparatus is able to return to its sleep mode to save energy.

According to a second aspect, an apparatus is provided that comprises: determining means to determine at least one wake-up opportunity, wherein the at least one wake-up opportunity indicates at least one radio resource available for transmitting at least one wake-up signal; and transmitting means to transmit, via a sidelink channel, in particular via a sidelink control channel, the at least one wake-up signal on the at least one wake-up opportunity.

According to a third aspect, a method is provided that comprises: receiving, via a sidelink channel, in particular via a sidelink control channel, and/or determining, via a sidelink resource pool, at least one wake-up opportunity of the sidelink channel, in particular of the sidelink control channel, wherein the wake-up opportunity indicates at least one radio resource available for receiving at least one wake-up signal; activating at least one energy saving function; monitoring the at least one wake-up opportunity, while the at least one energy saving function is active; receiving, while the at least one energy saving function is active, via the sidelink channel, in particular via the sidelink control channel, a wake-up signal on the monitored at least one wake-up opportunity; and deactivating the at least one energy saving function upon receiving the at least one wake-up signal.

According to an advantageous example, the wake-up signal comprises at least one sidelink group identifier that identifies at least one group of apparatuses, wherein the method comprises: decoding at least the sidelink group identifier of the wake-up signal; matching the at least one decoded sidelink group identifier with at least one sidelink group identifier a receiving apparatus is assigned to; and wherein the deactivating of the at least one energy saving function is performed if the matching provides a positive result.

Advantageously, only a certain group or type of terminals will be activated. For example, the one sidelink group identifier in the transmitted wake-up signal identifies a plurality of cars in the vicinity of the sender to wake up, whereas wearables like smart-watches or household appliances may keep sleeping, after the decode the wake-up signal.

According to an advantageous example, the method comprises: receiving, via the sidelink channel, in particular via the sidelink control channel, at least one wake-up opportunity indicator, in particular an offset in time and/or frequency to the radio resource over which the wake-up indicator is received, wherein the wake-up opportunity indicator indicates at least a first one of a plurality of wake-up opportunities for receiving the at least one wake-up-signal.

Advantageously, the synchronization of the sidelink apparatuses does not necessarily depend on a local clock synchronization and the transmitting apparatus governs the wake-up opportunity synchronization.

According to an advantageous example, the method comprises: receiving, via the sidelink channel, in particular via the sidelink control channel, and/or determining, via the sidelink resource pool, at least one wake-up periodicity; and monitoring at least one second wake-up opportunity based on the at least one wake-up periodicity.

Advantageously, the provided wake-up periodicity allows a periodic check via the monitoring, whether the apparatus has to return to its active state.

According to an advantageous example, the activating the at least one energy saving function comprises: receiving, via the sidelink channel, in particular via the sidelink control channel, a sleep signal; and wherein the activating of the at least one energy saving function is conducted upon the reception of the sleep signal.

According to an advantageous example, deactivating of the at least one energy saving function is terminated at the latest on expiry of a pre-configured activation time period since the receipt of the wake-up signal; and receiving and/or transmitting, via the sidelink channel, in particular via a sidelink shared channel, payload data after the expiry of the activation time period.

Advantageously, the activation time period allows the apparatus to wake-up in a power saving manner. Moreover, the complexity of the decoder and encoder can be reduced, as more time is available to deactivate the power saving function.

According to an advantageous example, the method comprises: receiving, via the sidelink channel, in particular via the sidelink control channel, or determining, from the sidelink resource pool, an active time period; and activating the energy saving function upon lapse of the active time period.

Advantageously, the deactivation after the active time period allows a predictable power saving scheme for the sidelink terminal. Moreover, the communication partners also know the communication window being provided via the active time period.

According to a fourth aspect of the description, there is provided an apparatus that comprises: receiving means to receive, via a sidelink channel, in particular via a sidelink control channel, and/or determining means to determine, via a sidelink resource pool, at least one wake-up opportunity of the sidelink channel, in particular of the sidelink control channel, wherein the wake-up opportunity indicates at least one radio resource available for receiving at least one wake-up signal; activating means to activate at least one energy saving function; monitoring means to monitor the at least one wake-up opportunity, while the at least one energy saving function is active; receiving means to receive, while the at least one energy saving function is active, via the sidelink channel, in particular via the sidelink control channel, a wake-up signal on the monitored at least one wake-up opportunity; and deactivating means to deactivate the at least one energy saving function upon receiving the at least one wake-up signal.

DETAILED DESCRIPTION

Figure 1:
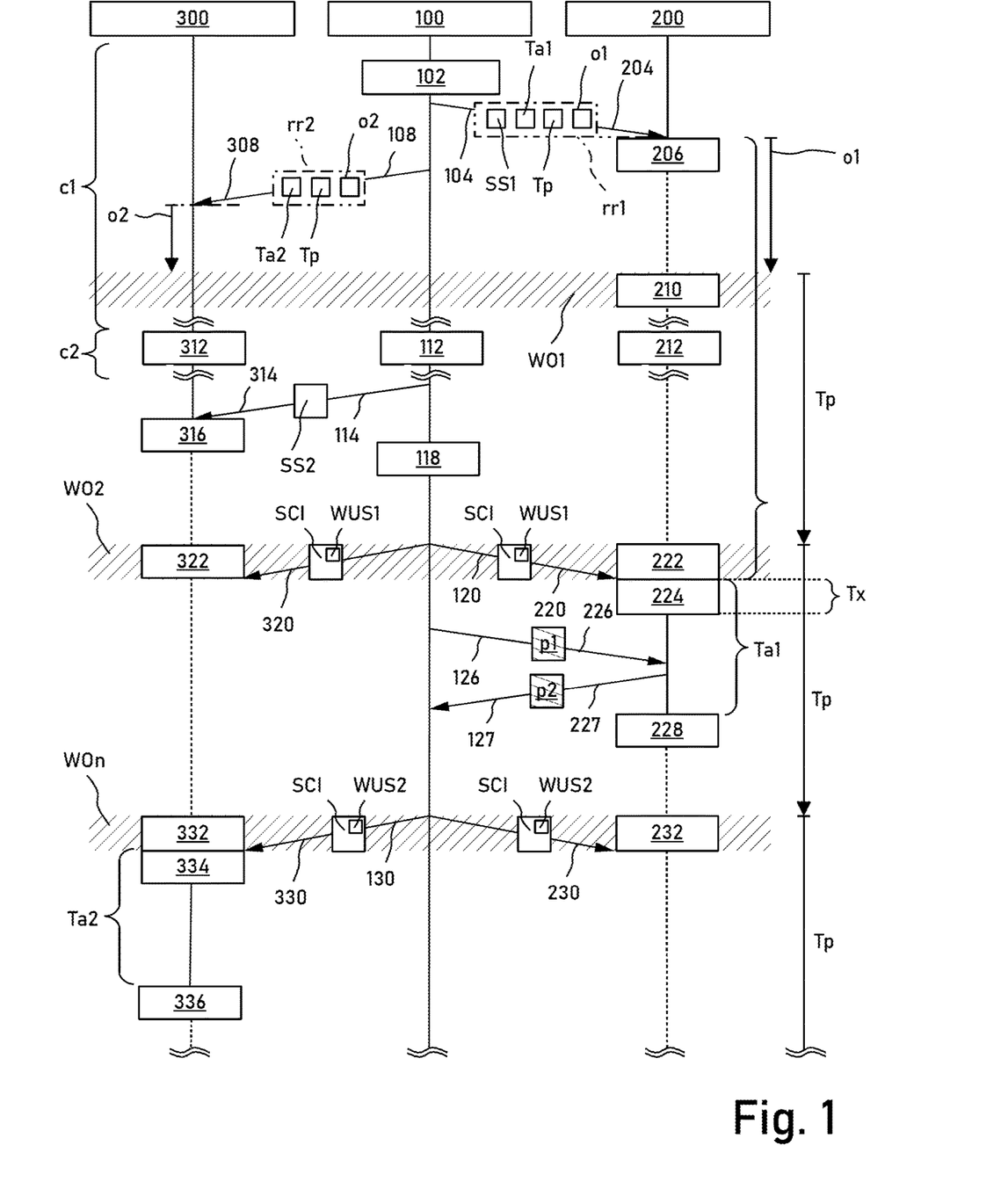
FIG. 1 depicts a schematic sequence diagram.

FIG. 1 depicts a schematic sequence diagram with apparatuses 100, 200, 300. These apparatuses 100-300 communicate via sidelink. The apparatuses 100-300 are termed terminals, UEs throughout the description. These terms are valid interchangeably.

The apparatus 100 comprises determining means 102, 112 to determine at least one wake-up opportunity WO1-$n$. The at least one wake-up opportunity WO1-$n$ indicates at least one radio resource available for transmitting at least one wake-up signal WUS1-2. The apparatus 100 comprises determining means 118 to determine to wake-up the apparatus 200 in order to communicate with it. Transmitting means 120, 130 are configured to transmit, via a sidelink channel, in particular via a sidelink control channel, the at least one wake-up signal WUS1-2 on the at least one wake-up opportunity WO1-$n$.

The wake-up signal WUS1, WUS2 is transmitted as part of the sidelink control information, SCI. The sidelink control information, SCI, point to the radio resources of the shared sidelink channel to be decoded. Therefore, the receiving terminal is able to decode the SCI first, and subsequently decode the information of the radio resources indicated by the SCI in which the wake-up signal WUS1, WUS2 is transmitted in.

According to an example, the wake-up signal WUS1, WUS2 is a wakeup pattern (1-bit or more bits) indicating a wakeup instruction.

According to an example, an SCI format is provided for a UE decoding it, if it appears in a wake-up opportunity WO1-$n$. The wake-up signal WUS1, WUS2 in the SCI instructs the receiving UE/apparatus/terminal to decode IDs in same or a sub-sequent slot or to decode control and data in a subsequent slot after a configured activation time period, later referenced as Tx or K0.

According to an example, a (pre-)configured synchronization signal is sent to wake up a plurality of receivers. Once the receivers sleep with the same periodicity wakes up, all receivers shall decode control and data in a subsequent slot after gap (pre-)configured activation time period For example, the wake-up signal WUS1, WUS2 comprises a sidelink group identifier identifying a group of terminals. According to other examples, broadcast or unicast identifiers are also feasible.

The determining means 112 for determining of the at least one wake-up opportunity WO2, WOn comprises: determining means for determining the at least one wake-up opportunity WO2, WOn from at least one sidelink resource pool, in particular of a pre-configured sidelink resource pool.

The at least one sidelink resource pool define physical resources in time and frequency that carry sidelink control and/or traffic data. The sidelink resource pool defines a set of radio resources, for example defined by a subset of subframes and resource blocks available within these subframes, for transmission and/or reception. The block of radio resources is repeated with a periodicity, for example a PSCCH period, which can range from 40 to 320 ms. The sidelink resource pool therefore reserves radio resources for transmission of sidelink control and/or payload data.

A network-driven transmission mode 1 can be applied if the UE is in coverage and the gNB assigns the radio resources on sidelink for the UE. In a transmission mode 2, the UE selects the radio resources used for transmission. The transmission mode 2 is applicable to coverage and out of coverage scenarios. The resources are selected by the UE in a randomized manner in order to reduce collisions.

The Physical Sidelink Shared Channel, PSSCH, is dedicated to sidelink payload data transmission, which is defined as a one-to-many transmission scheme, meaning that the data is to be received by multiple UEs that belong to a group. The Physical Sidelink Control Channel, PSCCH, is dedicated to transmit sidelink control information, SCI, that comprises resource allocation information of the physical sidelink shared channel.

The at least one sidelink resource pool can be broadcasted in a System Information Block. Then UEs use the received at least one sidelink resource pool. The former scenario provides a semi-static configuration. In another scenario, the UE is not in coverage and use at least one preconfigured resource pool that is defined either on a sim card or in the UE.

Transmitting means 104, 108 are provided to transmit, via the sidelink channel, in particular via the sidelink control channel, at least one wake-up opportunity indicator o1, o2, in particular an offset in time and/or frequency to the radio resource rr1, rr2 on which the wake-up indicator o1, o2 is transmitted. The wake-up opportunity indicator o1, o2 indicates at least one radio resource that is available for transmitting the at least one wake-up-signal WUS1-$n$.

Attention is drawn to a communication part c1, which can be used in combination with or without a further communication part. According to the communication part c1, the apparatus 100 takes the role of a master of reference node.

With the communication part c2, which can be used in combination with or without the communication part cp1, the apparatuses 100, 200, 300 know the wake-up opportunities WO1, WO2, WOn and the other parameters via the at least one sidelink resource pool. The at least one sidelink resource pool comprises the parameters like Ta1 and Tp to identify and attend the wake-up opportunities. In this case, the clocks of the apparatuses 100, 200, 300 are synchronized in order to determine at least the wake-up opportunities WO1-$n$.

According to an example, both communication parts c1 and c2 are used in a combined way. For example, priority sorting induces the apparatus 200 to adopt the configuration received via radio resource rr1 from the apparatus 100 and overwrite the configuration determined from the at least one sidelink resource pool. In this case, the communication part c2 happens before the communication part c1.

Determining means 102 determine a wake-up periodicity Tp, in particular based on the at least one resource pool, wherein the wake-up periodicity Tp prescribes a time period between at least two subsequent wake-up opportunities WO1-$n$. For example, the wake-up periodicity Tp is a time period between two wake-up opportunities WO1, WO2. Transmitting means 104, 108 transmit, via the sidelink channel, in particular via the sidelink control channel, the at least one wake-up periodicity Tp.

Transmitting 104, 114 are configured to transmit, via the sidelink channel, in particular via the sidelink control channel, a sleep signal SS1, SS2 in order to send another apparatus 200, 300 to its sleep mode.

Transmitting means 126 are provided to transmit and/or receiving means 127 are provided to receive, via the sidelink channel, in particular via a sidelink shared channel, sidelink payload data p1, p2 after expiry of a pre-configured activation time period Tx since the transmission 120 of the at least one wake-up signal WUS1-2.

Determining means 112 are provided to determine, in particular based on the at least one sidelink resource pool, an active time period Ta1, Ta2 that indicates how long another apparatus is at least active before returning to a sleep mode. The transmitting means 102 transmit, via the sidelink channel, in particular via the sidelink control channel, the active time period Ta1-2.

For the active time period Ta1, Ta2, the reception of the wake-up signal WUS1, WUS2 is the trigger to start the respective active time period Ta1, Ta2. According to a different example that is not shown, the active time period Ta1, Ta2 starts after or at the end of the activation time period.

In the figure, the dotted vertical lines indicate that the respective apparatus 100, 200, 300 is in sleep mode, wherein at least one power saving function is activated. On the other hand, the solid lines indicate that the respective apparatus 100, 200, 300 is in its active mode.

The apparatus 200, 300 comprises receiving means 204, 308 to receive, via the sidelink channel, in particular via the sidelink control channel, and/or determining means 212, 312 to determine, via the sidelink resource pool, at least one wake-up opportunity WO1-$n$ of the sidelink channel, in particular of the sidelink control channel. The wake-up opportunity WO1-$n$ indicates at least one radio resource available for receiving at least one wake-up signal WUS1-2.

Activating means 206, 228, 316 are provided to activate the at least one energy saving function, for example deactivating a decoder and/or encoder, or reducing the search space in sleep mode compared to the search space in active mode. Accordingly, the search space during the active mode is bigger in terms of frequency than the search space during the sleep mode. In sleep mode, the search space can become Zero and only the wake-up opportunities are monitored.

Monitoring means 210, 222, 232, 322, 332 are provided to monitor the at least one wake-up opportunity WO1-$n$, while the at least one energy saving function is active. Receiving means 220, 330 are provided to receive, while the at least one energy saving function is active, via the sidelink channel, in particular via the sidelink control channel, a wake-up signal WUS1-2 on the monitored at least one wake-up opportunity WO1-$n$. Deactivating means 224, 334 deactivate the at least one energy saving function upon receiving the at least one wake-up signal WUS1-2.

The monitoring 222, 322 comprises decoding a destination identifier that is part of the wake-up signal WUS1. If the destination identifier matches with the stored identifier, then the receiver and decoder are activated to receive data. Otherwise, the apparatus remains in its sleep state.

For example, the wake-up signal WUS1 comprises a group identifier and is dedicated to a group, the apparatus 200 pertains to but the apparatus does not. After monitoring 222, 322, the apparatus 200 will go to its active mode, whereas the apparatus 300 remains in its sleep mode and scans the next wake-up opportunity WO2. So, even receiving 320 and partly decoding the WUS1 will not wake-up the apparatus 300.

The wake-up signal WUS2 comprises a unique identifier and is associated with the apparatus 300 only. So, the wake-up signal WUS2 is dedicated to wake-up only apparatus 300. After monitoring 232, 332, the apparatus 200 will remain in its sleep mode, whereas the apparatus 300 will wake up via activating 334. So, even receiving 230 and partly decoding the WUS1 will not wake-up the apparatus 200.

Receiving means 204, 308, receive, via the sidelink channel, in particular via the sidelink control channel, at least one wake-up opportunity indicator o1, o2, in particular an offset in time and/or frequency to the radio resource rr1, rr2 over which the wake-up indicator o1, o2. The wake-up opportunity indicator o1, o2 indicates at least a first one of a plurality of wake-up opportunities WO1 for receiving the at least one wake-up-signal WUS1-n.

The receiving means 204, 308 receive via the sidelink channel, in particular via the sidelink control channel at least one wake-up periodicity. Alternatively or additionally, determining means 212, 312 determine, via the sidelink resource pool, the at least one wake-up periodicity Tp. The monitoring means 232, 332 monitor at least one second wake-up opportunity WOn based on the at least one wake-up periodicity Tp.

According to an example, a plurality of wake-up periodicities that are associated with a certain group of apparatuses are provided. For example, a first group of apparatuses associated with cars wake-up with a first periodicity, for example, every 100 ms. A second group of apparatuses associated with household devices wake up, every 5 seconds.

According to another example, apparatuses associated with vulnerable road users like bicycles or pedestrians determine the wake-up periodicity based on the present position and map data. For example, if the apparatus detects that it is moving nearby a road, the wake-up periodicity is increased to a value of 50 to 100 ms. On the other side, if the apparatus detect that it is moving inside a pedestrian-only area, the wake-up periodicity can be increased to 1 s or more.

The receiving means 204, 314 receive, via the sidelink channel, in particular via the sidelink control channel, a sleep signal SS1-2. The activating means 206, 228, 316 activate the at least one energy saving function upon the reception of the sleep signal SS1, SS2.

On the other hand, deactivating means 224 for deactivating the at least one energy saving function are terminated at the latest on expiry of a pre-configured activation time period Tx since the receipt of the wake-up signal WUS1-2.

Receiving means 226 receive and decode and/or transmitting means 227 transmit, via the sidelink channel, in particular via a sidelink shared channel, payload data p1, p2 after the expiry of the activation time period Tx.

According to an example, the at least one received wake-up signal WUS1-2 comprises a frequency indicator N2 that indicates at least one frequency range. The frequency indicator N2 could be transmitted implicitly by an associated bit pattern. Accordingly, there is a mapping between the frequency indicator and the frequency range. The receiving means 226 for receiving payload scans the indicated frequency range N2 in order to receive the payload p1. The transmitting means 227 for transmitting uses the indicated frequency range N2 for transmitting payload p2. For example, the frequency range N2 is greater than a frequency range N1 that serves to receive the wake-up signals WUS1-2. A frequency range can be referred to as a single or multiple subchannels.

The receiving means 204 receive, via the sidelink channel, in particular via the sidelink control channel, or determining means 212, 312 determine, from the sidelink resource pool, an active, 312 determine, from the sidelink resource pool, an active time period Ta1. Upon lapse of the active time period Ta1, Ta2, activating means 228, 336 activate the energy saving function and enter the sleep mode.

Figure 2:
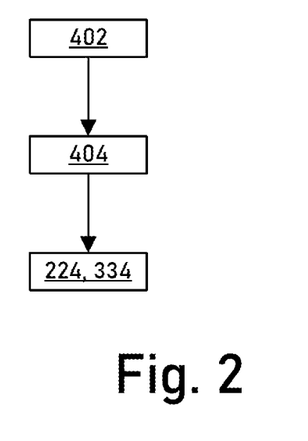
FIG. 2 depicts a schematic flow diagram.

FIG. 2 depicts a schematic flow diagram. The wake-up signal WUS1-2 of FIG. 1 comprises at least one sidelink group identifier that identifies at least one group of apparatuses. Decoding means 402 are configured to decode at least the sidelink group identifier of the wake-up signal. Matching means 404 match the at least one decoded sidelink group identifier with at least one sidelink group identifier a receiving apparatus 200, 300 of FIG. 1 is assigned to. The deactivating means 224, 334 deactivate the at least one energy saving function if the matching provides a positive result.

Figure 3:
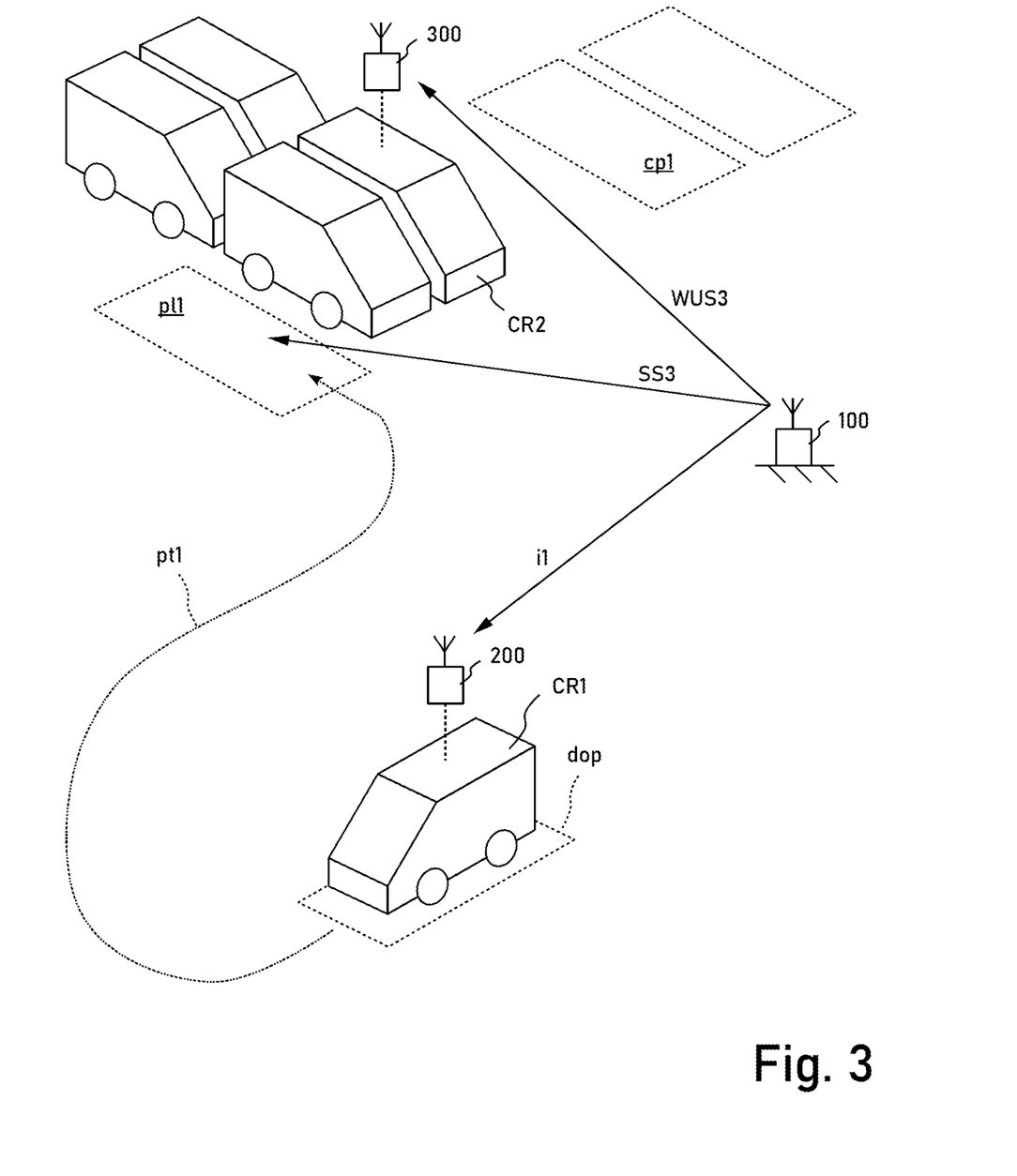
FIG. 3 depicts an automated valet parking scene.

FIG. 3 depicts a schematic use case for the described sidelink schemes. In an automated valet parking scenario, the driver of a car may leave its car CR1 at a drop-off position dop.

The apparatus 100 is configured as a roadside unit and installed at a fixed position. Here, the master (reference) network device is the apparatus 100. The apparatus 100 transmits an instruction i1, via sidelink, to the apparatus 200 associated with the car CR1, to autonomously move the car CR1 along a path pt1 to a parking lot pl1. Upon arriving at the parking lot pt1, the apparatus 100 transmits a sleep signal SS3 to the apparatus 200, so that the apparatus 200 enters its sleep mode.

For moving the car CR1 to another parking lot or to a pick-up position, the apparatus 100 transmits a wake-up signal to the car CR1 and subsequently instructions, which path the car CR1 has to follow.

If the apparatus 100 intends to move a car CR2 to a charging position cp in order to charge the car CR2, the apparatus 100 transmits a wake-up signal WUS3 to the apparatus 300 that is associated with the car CR2. Upon receiving the wake-up signal WUS3, the apparatus 300 switches from the sleep mode to the active mode. Accordingly, the apparatus 300 is able to receive an instruction from the apparatus 100 to move autonomously to the charging position cp1.

Another example, departing from FIG. 3, is directed to Vulnerable Road Users, VRUs. More than one WUS-Slot configurations can be present and are activated by the respective apparatuses 100-300 of FIG. 1 based on profiles. The profiles depend on actual VRU situation, for example static or moving or a position on map (in roads, off roads) or VRU conditions/use-cases (pedestrians or bicycle). Off-street a configuration with a long sleep duration (=Tp of FIG. 1) and a short waking-up duration (=Tx of FIG. 1) is chosen. In street or near street a short sleeping duration and a longer waking-up duration are chosen. The wake-up configurations are known to vehicles and pedestrians.

A public safety use case comprises waking up a cluster of UEs for public safety issues.

According to an aspect E1, a second UE configures a first UE via sidelink communication to go to the sleep mode for a sleep time and wake-up frequently on pre-configured slots, i.e., to be able to decode a possible wakeup signals (WUS) in a wakeup opportunity (WUS-slot). If the first UE does not decode any wake-up signal (WUS) instruction on sidelink during a wake-up slot (WUS-slot), the UE goes again to sleep mode after only shortly decoding a single SCI occasion in that slot or by decoding M-symbols that contains SCI and/or WUS (e.g., M=1, 2, 3, or 4 symbols out of 14 symbols). Hence, the UE keeps sleeping until the next wakeup slot (WUS-slot), i.e., after sleep a sleeping period T2/P_sleep [slots/milliseconds]. If the first UE decodes (during the wake up phase) an SCI with a waking up instruction in the WUS-slot, the UE then decodes a PSSCH in a subsequent slot after a time gap K0. Wherein the WUS comes in, e.g., a part of the SCI. The UE in the WUS-slot or in a subsequent slot may need to decode a specific information to wake up, e.g., a destination ID equal that of the UE or of the UE interest, e.g., group specific/service destination ID. Once the first UE is awake based on the wake-up instruction (WUS) and/or decoding the requested destination ID, the first UE continues to decode signals (control and data) for either:
- a certain (pre-)configured active time T3 or
- until it receives another sleeping command.

The first UE may be configured to go to a deep sleep for sidelink transmission for a certain time and wake-up only (frequently) on periodic pre-configured slots or a pattern of a preconfigured slots. Once the first UE is awake, it is able to decode possible wakeup signals (WUS) in the dedicated (periodic/pattern-based) wakeup signaling slot (WUS-slot).

The WUS-slot may contain a WUS with the sidelink control channel (SCI) carrying an indication for the first UE to wake up. The first UE needs at least to decode the WUS in at least M-consecutive time symbols in a possible WUS-slot to identify a WUS command. Therefore, the UE is requested to wake UP shortly on each WUS-slot (which comes every T2/P_sleep or on a certain pattern) to decode these M-symbols to identify a WUS.

Once the first UE is awake, i.e., based on the wake-up instruction (WUS), the UE may decode a destination ID in the same WUS-slot or in a subsequent slot, where the Destination ID indicates the first identical ID or one of the first UE's intended group or service ID. After decoding a WUS and/or destination ID, the UE may decode further SCI+their associated data (physical sidelink shared channel, PSSCH) staring from a subsequent slot after K0 minimum time gap, where K0 can be configured or pre-configured to the UE or per resource pool.

Once the first UE wakes based on WUS, the UE continues to decode signals (control and data), e.g., for a certain (pre-)configured active time T3, where the UE is request to decode all control channels in T3 [milliseconds or slots] and all its associated data. In another example, the UE may only decode all subsequent slots until it receives another sleeping command.

According to an aspect E2.1, a WUS signal is decoded and identified by a waking up received. The WUS (in a WUS-slot) may not need to buffer the whole slot but rather decode M symbols that contains the WUS control information. This WUS can be identified as follows:
- Option 1-1: A wakeup pattern (1-bit or more bits) indicating a wakeup instruction
- Option 1-2: A specific SCI format for which if a UE decodes in a WUS-slot, it is instructed to decode IDs in same or a sub-sequent slot or to decode control and data in a subsequent slot after gap (pre-)configured time K0
- Option 2: A (pre-)configured (general) synchronization signal which is sent to wake up all receivers. Once all receivers sleeping with the same periodicity wakes up, all receivers shall decode control and data in a subsequent slot after gap (pre-)configured time K0

There are two options to send WUS:
- Option 1: In part of the physical sidelink control channel (SCI) (for a specific UE/a group of UEs using (e.g., unicast and group cast) or all UE (e.g., broadcast))
- Option 2: In part a part of the sidelink broadcast channel (PSBCH), in this case it is targeting all UE in a broadcast message.

For option 1 (1.1); WUS may be identified for a specific UE (unicast), group of UEs (group-cast) or all UEs (broadcast). In the first two cases (unicast and/or groupcast), the UE may need to decode a specific destination ID as indicated before. However, in case of broadcast WUS in SCI, a destination ID is not required. This case can be easily identified by the UE based on the cast type identified by the SCI associated with the WUS. The WUS can be a single bit/more bits pattern or a specific SCI format as when transmitted, the UE may identify that this is a WUS SCI.

In option 2, a second UE (a UE requesting the first UE to wake up) may send a synchronization pattern to all UEs. If this pattern is transmitted in an identified WUS-slot, this requests all receiving UEs to wake up and perform an SCI+data (PSSCH) decoding from a minimum K0 slots. In one example, K0 in this case can be equal to 1. Wherein, the UEs that receives the synchronization pattern indicating WUS will start to decode all subsequent slots carrying data and control until either T3 or another go to sleep signal.

According to an aspect E2.2, once the WUS is received in a WUS-slot, the UE may requested to wake up to decode only:
- the M symbols in the WUS-slot, which contains WUS instruction as in E2.1, and/or
- N1 subchannels, which is the limited number of subchannels that contains WUS signal. This is designed to keep power limited.

Once the WUS symbols are decoded, associated ID in same or subsequent slot is decoded, associated (reserved) data and control in a subsequent slot with a minimum gap K0 are decoded, further slots with data and control are decoded in subsequent slots up to a maximum preconfigured active time T3 (in milliseconds or slots) or until a sleeping command is received.

Once the WUS is received in a limited number of subchannels N1, the UE may switch to a bigger number of subchannels (N2, where N2>=N1). Hence, the UE may decode control and data in the wider subchannel space N2.

Once the WUS is received in a WUS-slot, the UE may requested to wake up to decode only M time symbols, where e.g., M=1, 2, 3, 4 symbols out of the slot 14 symbols. Then the UE is requested to decode control and data in a subsequent slot after at least K0 minimum slots (i.e., if K0 is configured). Otherwise (if K0 is not configured), the first UE assumed K0=1 (i.e., the direct subsequent slot to the WUS-slot).

In another embodiment, the WUS signal (control signal or synchronization block signals) may be sent only every WUS-slot but limited to a narrow subchannel (in frequency) width. In this case, the UE receives WUS in a WUS slot on an identified/configured N1 subchannels (i.e., smaller that the Bandwidth-part or subcarrier spacing). Once the UE receives a WUS in a WUS-slot, it automatically decode a subsequent slot after, e.g., K0 slots, with a channel width of N2 subchannels. In this case, N2>N1.

According to an aspect E3.1, WUS is synchronized to a resource pool configuration: The resource pool configuration may contain marked slots of type a WUS-slots, which may contain WUS as in E2.1. Wherein a UE may sleep, on its own or instructed to sleep via a go-to-sleep command, and wake up on each marked WUS-slot to decode any possible WUS and perform further decoding as instructed in the WUS (as in E2.1). In which, the first UE may receive a Go-to-sleep command from a second UE (e.g., a RSU) or the network where the UE can wake up again in the next possible WUS-slot. Furthermore, the first UE may keep waking up and checking for WUS every WUS slot. Additionally, the WUS-slot location in a resource pool is configured as follows:
- a certain bit-map which may indicate WUS-slot indices in a single resource pool or in multiple resource pool (either overlapped or non-overlapped resource pools)
- a starting index reference to an SFN (subframe number) or a function in SFN and a periodicity P_sleep. There could be more than index or more P_sleep for a single resource pool or in multiple resource pool (either overlapped or non-overlapped resource pools).

The sleeping function and WUS-slot indices indication can be done via resource pool configuration that contains a WUS-slots positions, which could be a certain bit map or a location to start a periodic sleeping function with periodicity T2/P_sleep and starting SFN location(s) (E3.1). In this case, the first UE may go to sleep on its own or it may wait got to sleep in another (second) UE send to it a Go-to-sleep function. Hence, the first UE uses the WUS-slot to wake up to decode possible WUS and sleep in between.

According to an aspect E3.2, WUS is synchronized to a radio-entity via go-to-sleep signal: A reference UE (second UE (e.g., a RSU)) or radio network node (RNN) may instruct a first UE to sleep after T1, where T1 is the time between transmission of go-to-sleep instance and the nest possible WUS-slot decided by the reference UE/RNN. Hence, T1 is function of the transmission instance and a pre-defined WUS-slot. Thus, the reference UE/RNN may need to compute it every time it instructs a UE to sleep.

E3.2) In another embodiment, WUS-slots may be indicated via an organizing entity, e.g., another second UE (e.g., a RSU or master UE) or a network radio node that may send a command to trigger the sleep/awake function with an index to start the sleeping function and a periodicity to repeat it. Triggering sleeping/sleeping command may be sent via physical layer messages or upper layer messages or via sidelink system information S-SIB.

Once the first UE (which needs to be sent sleeping) receives the triggering or sleeping command, the UE may indicate/computes a WUS-slots from the go-to-sleep command sent by a reference (second) UE/RNN. In this case,
the first UE computes the WUS-slot index based on the received go-to-sleep index and T1 indicated in the go-to-sleep command.
the reference (second) UE/RNN may need to compute T1 to allow synchronous sleeping of all other UEs in its zone. In an example, T1 is (pre)configured between 0 and T1_max (i.e., the maximum frame number). In this case, assumes the second UE send the Go-to-sleep at instance 100 and if WUS-slot starts at 120, then T1=20. If the P_sleep periodicity is 100, i.e., T2=100, then second UE sends go-to-sleep(T1=20, and T2=100). Once a first UE receives this, it can conduct that the first time to expect WUS-Slot is 120, then 220, then 320, etc.

The invention claimed is:

1. A method of operating a radio communication apparatus, the method comprising:
determining at least one wake-up opportunity, wherein the at least one wake-up opportunity indicates at least one radio resource available for transmitting at least one wake-up signal;
determining a configuration of an activation time period and a periodicity of the apparatus based on a profile of the apparatus, wherein the profile is based on at least one condition of the apparatus selected from the group consisting of: static, moving, and a position proximate to an area of a map;
transmitting, via a sidelink channel, the at least one wake-up signal on the at least one wake-up opportunity; and
transmitting and/or receiving, via the sidelink channel, sidelink payload data after expiry of the activation time period since the transmission of the at least one wake-up signal, wherein the activation time period is a time period configured for deactivating at least one energy saving function and expires during an active time period.

2. The method according to claim 1, wherein the wake-up signal comprises a sidelink group identifier identifying a group of apparatuses and/or an identifier identifying a single apparatus.

3. The method according to claim 2, wherein a plurality of wake-up opportunities are associated with a group of apparatuses.

4. The method according to claim 1, wherein the determining of the at least one wake-up opportunity comprises:
determining the at least one wake-up opportunity from at least one sidelink resource pool, wherein the at least one wake-up opportunity is determined by selecting, from the at least one sidelink resource pool, the at least one radio resource available for transmitting the at least one wake-up signal.

5. The method according to claim 1 further comprising:
transmitting, via the sidelink channel at least one wake-up opportunity indicator, wherein the wake-up opportunity indicator indicates at least one radio resource that is available for transmitting the at least one wake-up-signal.

6. The method according to claim 1 further comprising:
determining a wake-up periodicity, based on the at least one resource pool, wherein the wake-up periodicity prescribes a time period between at least two subsequent wake-up opportunities; and
transmitting, via the sidelink channel, the at least one wake-up periodicity.

7. The method according to claim 1 further comprising:
transmitting, via the sidelink channel, a sleep signal.

8. The method according to claim 1, wherein the activation time period is determined based on the apparatus and resource pool.

9. The method according to claim 1, wherein the at least one wake-up signal comprises a frequency indicator that indicates at least one frequency range for transmitting and/or receiving payload data via sidelink.

10. The method according to claim 1 further comprising:
determining, based on the at least one sidelink resource pool, the active time period that indicates how long another apparatus is at least active before returning to a sleep mode; and
transmitting, via the sidelink channel, the active time period.

11. The method according to claim 1, wherein the at least one wake-up signal comprises a wake-up pattern indicating a wake-up instruction.

12. The method according to claim 1, wherein the at least one wake-up signal instructs a receiver of the wake-up signal to decode the information indicated by a SCI in a subsequent slot after the activation time period.

13. The method according to claim 1, wherein the activation time period and the active time period occurring during a wake up periodicity, wherein the wake-up periodicity is determined based on a condition the apparatus.

14. The method according to claim 1, wherein the activation time period begins and expires during the active time period.

15. A radio communication apparatus comprising:
a transmitter configured to transmit signals,
a receiver configured to receive signals, and
an electronic controller configured to:

determine at least one wake-up opportunity, wherein the at least one wake-up opportunity indicates at least one radio resource available for transmitting at least one wake-up signal;

determine a configuration of an activation time period and a periodicity of the apparatus based on a profile of the apparatus, wherein the profile is based on at least one condition of the apparatus selected from the group consisting of: static, moving, and position proximate to an area of a map;

transmit, via the transmitter and a sidelink control channel, the at least one wake-up signal on the at least one wake-up opportunity; and transmit and/or receive, via the transmitter and/or the receiver via the sidelink channel, sidelink payload data after expiry of the activation time period since the transmission of the at least one wake-up signal, wherein the activation time period is a time period configured for deactivating at least one energy saving function and expires during an active time period.

16. A method of operating a radio communication apparatus, the method comprising:

determining, via a sidelink resource pool, at least one wake-up opportunity from at least one sidelink resource pool, wherein the sidelink resource pool is a preconfigured sidelink resource pool, wherein the at least one wake-up opportunity indicates at least one radio resource available for receiving at least one wake-up signal as part of a sidelink control information;

receiving, via a sidelink channel, at least one further wake-up opportunity of the sidelink channel, wherein the sidelink channel is a sidelink control channel, wherein the at least one further wake-up opportunity indicates at least one further radio resource available for receiving at least one further wake-up signal selected from a sidelink resource pool;

in response to receiving the at least one further wake-up opportunity, overwriting a first configuration with a second configuration by performing priority sorting, wherein the priority sorting induces the apparatus to adopt the second configuration, wherein the first configuration is based on the preconfigured sidelink resource pool, and wherein the second configuration is based on the at least one further radio resource that is received;

activating at least one energy saving function;

monitoring the at least one further wake-up opportunity, while the at least one energy saving function is active;

receiving, while the at least one energy saving function is active, via the sidelink channel, a wake-up signal on the monitored at least one further wake-up opportunity; and deactivating, prior to expiry of an activation time period and during an active time period, the at least one energy saving function upon receiving the wake-up signal.

17. The method according to claim 16, wherein the wake-up signal comprises at least one selected from a group consisting of a sidelink group identifier and an identifier, wherein the sidelink group identifier identifies at least one group of apparatuses, wherein the identifier identifies a single apparatus, and wherein the method further comprises:

decoding at least the sidelink group identifier of the wake-up signal;

matching the at least one decoded sidelink group identifier with at least one sidelink group identifier a receiving apparatus is assigned to; and wherein the deactivating of the at least one energy saving function is performed if the matching provides a positive result.

18. The method according to claim 17, wherein a plurality of wake-up opportunities are associated with a group of apparatuses.

19. The method according to claim 16 further comprising:

receiving, via the sidelink channel, at least one wake-up opportunity indicator, wherein the wake-up opportunity indicator indicates at least a first one of a plurality of wake-up opportunities for receiving the at least one further wake-up-signal.

20. The method according to claim 16 comprising receiving, via the sidelink channel, and/or determining, via the sidelink resource pool, at least one wake-up periodicity; and monitoring at least one second wake-up opportunity based on the at least one wake-up periodicity.

21. The method according to claim 16 comprising receiving, via the sidelink channel, a sleep signal; and wherein the activating of the at least one energy saving function is conducted upon the reception of the sleep signal.

22. The method according to claim 16, wherein the activation time period is determined based on the apparatus and resource pool.

23. The method according to claim 16, wherein the at least one received wake-up signal comprises a frequency indicator that indicates at least one frequency range; and wherein receiving and/or transmitting of a payload is conducted in the indicated frequency range.

24. The method according to claim 16 further comprising:

receiving, via the sidelink channel, or determining, from the sidelink resource pool, the active time period; and activating the energy saving function upon lapse of the active time period.

25. An apparatus comprising:

a receiver configured to receive signals, an electronic controller including an electronic processor and a memory, the electronic controller configured to:

determine, via a sidelink resource pool, at least one wake-up opportunity from at least one sidelink resource pool, wherein the sidelink resource pool is a preconfigured sidelink resource pool, wherein the at least one wake-up opportunity indicates at least one radio resource available for receiving at least one wake-up signal as part of a sidelink control information;

receive, via the receiver and via a sidelink channel, at least one further wake-up opportunity of the sidelink channel, wherein the sidelink channel is a sidelink control channel, wherein the at least one further wake-up opportunity indicates at least one further radio resource available for receiving at least one further wake-up signal selected from a sidelink resource pool;

in response to receiving the at least one further wake-up opportunity, overwrite a first configuration with a second configuration by performing priority sorting, wherein the priority sorting induces the apparatus to adopt the second configuration, wherein the first configuration is based on the preconfigured sidelink resource pool, and wherein the second configuration is based on the at least one further radio resource that is received;

activate at least one energy saving function;

monitor the at least one further wake-up opportunity, while the at least one energy saving function is active;

receive, while the at least one energy saving function is active, via the receiver and via the sidelink channel, a wake-up signal on the monitored at least one further wake-up opportunity; and deactivate, prior to expiry of an activation time period and during an active time period, the at least one energy saving function upon receiving wake-up signal, wherein the activation time period occurs during the active time period.

\* \* \* \* \*